Patented May 30, 1939

2,159,999

UNITED STATES PATENT OFFICE 2,159,999

PREVENTING THE CAKING OF SODIUM PERBORATE

Joseph S. Reichert and Howard L. Potter, Niagara Falls, N. Y., assignors to E. I. du Pont de Nemours & Company, Wilmington, Del., a corporation of Delaware No Drawing. Application September 29, 1937, Serial No. 166,397

2 Claims. (Cl. 23—243)

This invention relates to the preparation of anti-caking mixtures of powdery materials. More particularly, it relates to the preparation of anti-caking preparations of sodium perborate.

Sodium perborate, usually sold in commerce in the form of tetrahydrate, $NaBO_3 \cdot 4H_2O$, is a fine powdery material which has a decided tendency to cake during storage. Wherever the powder is subjected to conditions of relatively high humidity, such as during storage in warm climates or during the summer season, the powder cakes to a degree which seriously interferes with its utilization. Since sodium perborate is largely used in oral and dental preparations it is essential that it remain free flowing under substantially all conditions of use. Caking and hardening during storage, possibly accompanied to some extent by loss of water, is detrimental and renders less satisfactory the ordinary sodium perborate of commerce.

We have now found that sodium perborate, particularly the tetrahydrate, $NaBO_3 \cdot 4H_2O$, may be rendered free flowing under practically all conditions of storage, if there is incorporated with the perborate a small amount of magnesium benzoate ($MgC_{14}H_{10}O_4$). Amounts of magnesium benzoate ranging from 4–10%, based on the weight of the sodium perborate stabilized against caking, will be found most suitable. It may be stated that the reduction in the tendency of the sodium perborate to cake is more or less directly proportional to the amount of magnesium benzoate added. However, we have found that amounts of magnesium benzoate in excess of 10%, while tending to increase the degree of free flowing to a certain extent, do not add sufficiently to the anti-caking tendencies of the powder to warrant the employment of amounts of magnesium benzoate greater than 10%.

While the use of magnesium hydroxide as an anti-caking agent for sodium perborate has been disclosed in the patent literature, we have found that magnesium benzoate is very much more satisfactory than the hydroxide. We have observed that magnesium benzoate is at least three times more effective than magnesium hydroxide in eliminating the tendency of the sodium perborate to cake when equal amounts of each agent up to 10% by weight, based upon the weight of the sodium perborate stabilized, are present.

As an example of our novel sodium perborate stabilized against caking by the addition of magnesium benzoate, it may be stated that a sample of sodium perborate tetrahydrate containing 5% magnesium benzoate was prepared. This powdery product had approximately one-third of the tendency to cake that a similar sample of perborate prepared containing 5% of magnesium hydroxide possessed. Its free flowing properties were approximately fifteen times as great as those of sodium perborate tetrahydrate containing no anti-caking agent. The magnesium benzoate was thoroughly and evenly dispersed throughout the powdery sodium perborate prior to testing by thorough mixing.

It is to be understood that the foregoing example is merely illustrative and by no means limits the scope of our invention. Our invention may be incorporated in various other embodiments than that disclosed as the preferred embodiment, as signified by the scope of the appended claims.

We claim:

1. A dry, stable mixture comprising sodium perborate in powdered form and sufficient magnesium benzoate to stabilize said powdered sodium perborate against caking upon storage.

2. A dry, pulverulent mixture consisting essentially of sodium perborate which comprises sodium perborate in powdered form and from 4 to 10% by weight of magnesium benzoate, said percentage of magnesium benzoate being by weight based on the weight of said sodium perborate.

JOSEPH S. REICHERT.
HOWARD L. POTTER.